United States Patent Office 3,432,596
Patented Mar. 11, 1969

3,432,596
METHOD FOR PRODUCING HIGHLY PURE HIRUDINE
Fritz Markwardt, Erfurt, Gerhard Schäfer and Horst Topfer, Radebeul, and Peter Walsmann, Erfurt, Germany, assignors to VEB Arzneimittelwerk Dresden, Radebeul, Germany
No Drawing. Continuation-in-part of application Ser. No. 395,940, Sept. 11, 1964. This application Oct. 13, 1967, Ser. No. 675,034
U.S. Cl. 424—95                3 Claims
Int. Cl. A61k 17/18; C07g 7/00

ABSTRACT OF THE DISCLOSURE

This invention relates to the method of producing highly pure hirudine from leeches, and more particularly to the purification of hirudine obtained by fractionation methods from leeches by a specific method involving gel filtration using heavily cross-linked dextrans.

CROSS-REFERENCE TO RELATED APPLICATIONS

This application is a continuation-in-part of our copending application Ser. No. 395,940, filed Sept. 11, 1964, now abandoned, entitled, "Hirudine From Leeches and Process for Recovery Thereof." This application is also related to application Ser. No. 316,797, filed Oct. 15, 1963, now U.S. Patent No. 3,300,383, which describes a method of obtaining purified hirudine by ethanol fractionation or oxycellulose treatment and adsorption on a slightly acidic cation exchanger.

BACKGROUND OF THE INVENTION

It has been known for some time that leeches contain an agent which acts specifically against blood clotting by combining with the clotting enzyme thrombine to a stoichiometrically well defined practically undissociated complex which offsets the thrombine effect.

According to one known process, crude hirudine is obtained by the extraction of dehydrated heads of leeches with a mixture of acetone and water, followed by fractional precipitation by acetone. The crude product is then purified by electrodialysis, propanol extraction and subsequent electrophoresis with paper.

Although the above method of preparation leads to hirudine which is electrophoretically uniform, it is not useful for the production of hirudine on a large scale because of the insurmountable difficulty residing in the step of electrophoresis with the elution of hirudine-containing zones previously marked and cut out. Considerable losses are in the process so that the yield of hirudine cannot be higher than 20% of the hirudine actually present in leeches.

Other methods, such as that described in our application Ser. No. 316,797, include obtaining purified hirudine by ethanol fractionation or by oxycellulose treatment and by adsorption on a slightly acidic cation exchanger. However, at best these methods lead to a hirudine in a yield of 70% and having an activity of 4500 ATU/mg.

SUMMARY OF THE INVENTION

It is accordingly a primary object of the present invention to provide a method for purifying crude hirudine obtained by extraction of dehydrated heads of leeches which results in the production of hirudine of considerably higher purity than could hitherto be obtained, and by a method which can be carried out on a commercial scale.

Other objects and advantages of the present invention will be apparent from a further reading of the specification and of the appended claims.

With the above and other objects in view, the present invention mainly comprises the purification of hirudine by introducing an aqueous solution of hirudine having a specific activity on the order of up to about 4500 ATU/mg. into a column containing a bed of highly cross-linked dextran gel having a water regained value of about 4.7 to 5.3, the ratio of the dimensions of the column being on the order of about 110–150 cm. by 1 cm., preferably about 130 cm. by 1 cm. and the height of the cross-linked dextran gel being between about 90 and 130 cm., preferably about 110 cm., covering the cross-linked dextran gel bed with water after penetration of the cross-linked dextran gel bed by the aqueous solution and commencing elution, collecting the eluate in small fractions, subjecting each fraction to spectrophotometric absorption measurement at 280 nm. and hirudine titration of thrombine, and recovery of the fraction of highest hirudine purity. This fraction corresponds to a specific activity of about 8400 ATU/mg.

It has been discovered that by using elongated gel-filled columns of heavily cross-linked dextran, it is possible to eliminate further impurities through filtration of aqueous hirudine solutions.

Any commercially available highly high crossed-linked dextran gel having the desired water regain value of about 4.7–5.3 g./g. is suitable for the purposes of the present invention. The cross-linking of the dextran is generally effected by means of epichlorohydrin, and among the suitable commercial products available which are dextran cross-linked by epichlorohydrin and which have the desired water regain value are sold under the trade names of "Sephadex" and "Epidex." However, dextrans cross-linked by any other means, such as described in Chemie-Ingenieur-Technik 38, Jahrgang H4 S445–451 (1966), Biochemisches Taschenbuch von H. M. Rauen, 2, Teil, 2, Auflage Springer Verlag 1964, S905–907, I. Flodin: Dextran Gels and Their Applications in Gel Filtration, Pharmacia, Uppsala, Sweden, 1962.

It is to be understood that it is not the particular method of cross-linking which is essential, the cross-linking occurring by ether bonds, however, what is essential is that the degree of cross-linking be such as to give the desired water regain value.

The hirudine which is subjected to the purification process of the present invention may be obtained by any known method of extraction from leeches, e.g., extraction of the dehydrated heads of the leeches by a mixture of acetone and water. Most preferably, the hirudine which is used is obtained according to the method disclosed in our application Ser. No. 316,797.

The hirudine, which is a polypeptide, is easily obtained from the collected fractions by precipitation with alcohol or by lyophilization. By the use of the above described method of gel filtration over cross-linked dextran, the specific activity of the prepurified preparation of hirudine is increased to 1.5–2 times the original activity namely to about 8400 ATU/mg. as compared to an original activity which is at most about 4500 ATU/mg. The yield is 80–90%.

One of the advantages of the method of the present invention of purifying the hirudine consists in that the separation occurs in pure aqueous solution, and by the simple features of increasing the diameter of the columns, any desired quantity of prepurified hirudine preparation can be further purified.

DESCRIPTION OF PREFERRED EMBODIMENTS

The following example is given to further illustrate the present invention. The scope of the invention is not, however, meant to be limited to the specific details of the example.

Example 250 mg. hirudine having a specific activity of 4420 ATU/mg., and obtained according to the process described in application Ser. No. 316,797, are dissolved in 1 cc. of water and a solution is introduced into a column filled with cross-linked dextran gel having a water regain value (g./g.) of about 4.7 to 5.3. The dextran gel is cross linked by means of epichlorohydrin and is sold under the trade name of "Sephadex."

The dimensions of the columns are as follows: 130 cm. by 1 cm. The height of the dextran filling is about 110 cm.

After the solution has penetrated the gel bed the latter is carefully covered with distilled water and the elution is started. The rate of elution amounts to about 10 cc. per hour. The obtained liquid is collected in fractions of 3 cc. The first 60 cc. contains impurities and only a very small amount of active hirudine. The main amount of hirudine is contained in the following 20 cc. Subsequently, low molecular impurities without any hirudine are obtained.

In every fraction, the protein content is determined by spectrophotometric absorption measurement at 280 nm. (nanometer) and the coagulation concentration determined by the hirudine titration. See F. Markwardt: "The Determination of Thrombine by Titration With Hirudine," Arch. Pharm. 290, 280 (1957).

Hirudine is obtained by lyophilization from the aqueous solution or by precipitation with 10 times the amount of ethanol. The yield is about 90% of the used amount of ATU/mg. The specific activity of the preparation is about 8400 ATU/mg.

What is claimed is:

1. Method of purifying hirudine, which comprises introducing an aqueous solution of hirudine having a specific activity up to about 4500 ATU/mg. into a column containing a bed of highly cross linked dextran gel having a water regain value (g./g.) of about 4.7 to 5.3, the ratio of the dimensions of the column being on the order of about 110–150 cm. by 1 cm., and the height of the cross-linked dextran gel being about 90–130 cm., covering the cross-linked dextran gel bed with water after penetration of the cross-linked dextran gel bed by said aqueous solution, and commencing elution, collecting the eluate in small fractions, subjecting each fraction to spectrophotometric absorption measurement at 280 mm. and hirudine titration of thrombine, and recovering the fractions of highest hirudine purity, corresponding to a specific activity on the order of about 8400 ATU/mg.

2. Method according to claim 1, wherein the ratio of the dimensions of the column are on the order of 130 cm. by 1 cm. and the height of the cross-linked dextran gel is about 110 cm.

3. Method according to claim 2 wherein the aqueous solution of hirudine contains about 250 mg. hirudine per ml. of water, wherein the eluate is collected in fractions of 3 cc. each, and wherein the hirudine is recovered from the fractions comprising the 20 cc. following the first 60 cc.

References Cited

UNITED STATES PATENTS 3,002,823  10/1961  Flodin et al. _____ 167—65 X

ALBERT T. MEYERS, *Primary Examiner.*

V. C. CLARKE, *Assistant Examiner.*

U.S. Cl. X.R.

260—112

UNITED STATES PATENT OFFICE

CERTIFICATE OF CORRECTION

Patent No. 3,432,596                                                March 11, 1969

Fritz Markwardt et al.

It is certified that error appears in the above identified patent and that said Letters Patent are hereby corrected as shown below:

Column 4, line 11, "mm" should read -- nm --.

Signed and sealed this 31st day of March 1970.

(SEAL)
Attest:

Edward M. Fletcher, Jr.                          WILLIAM E. SCHUYLER, JR.

Attesting Officer                                         Commissioner of Patents